United States Patent [19]

Focke et al.

[11] Patent Number: 4,680,024

[45] Date of Patent: Jul. 14, 1987

[54] APPARATUS FOR PRODUCING BAGS FROM A TUBULAR SHEET OF THERMALLY WELDABLE FILM MATERIAL

[75] Inventors: Heinz Focke; Oskar Balmer, both of Verden, Fed. Rep. of Germany

[73] Assignee: Focke & Co., (GmbH & Co.), Verden, Fed. Rep. of Germany

[21] Appl. No.: 804,031

[22] Filed: Dec. 3, 1985

[30] Foreign Application Priority Data

Dec. 20, 1984 [DE] Fed. Rep. of Germany ....... 3446409

[51] Int. Cl.⁴ .................. B31B 23/14; B31B 23/64
[52] U.S. Cl. ................. 493/197; 493/205; 493/209
[58] Field of Search ............ 493/189, 190, 193, 205, 493/206, 209, 197; 156/311, 439, 498

[56] References Cited

U.S. PATENT DOCUMENTS

| | | | |
|---|---|---|---|
| 2,441,940 | 5/1948 | Rohdin | 493/190 |
| 3,122,467 | 2/1964 | Hannon | 493/480 |
| 3,192,095 | 6/1965 | Doyen et al. | 493/189 |
| 3,622,421 | 11/1971 | Cook | 493/190 |
| 3,983,794 | 10/1976 | Buchner | 493/206 |
| 4,214,509 | 7/1980 | Van Der Mevlen | 493/196 |
| 4,261,779 | 4/1981 | Welh | 156/251 |
| 4,419,167 | 12/1983 | Hay, II et al. | 156/290 |

FOREIGN PATENT DOCUMENTS 1415906  12/1975  United Kingdom ............ 493/194

Primary Examiner—Frederick R. Schmidt
Assistant Examiner—William E. Terrell
Attorney, Agent, or Firm—Sughrue, Mion, Zinn, Macpeak, and Seas

[57] ABSTRACT

Bags for packaging cut tobacco are severed from a continuous longitudinally moving film sheet along transverse welding seams 28 which are made by a thermal welding unit 29 having three, transverse-welding jaws, during each working cycle. The welding unit can be moved to and fro and is movable with the film sheet 25 for a part section (conveying section). During the return movement of the welding unit to its starting position, the film sheet is conveyed onwards by a special draw element, until a conveying cycle has been completed.

21 Claims, 18 Drawing Figures

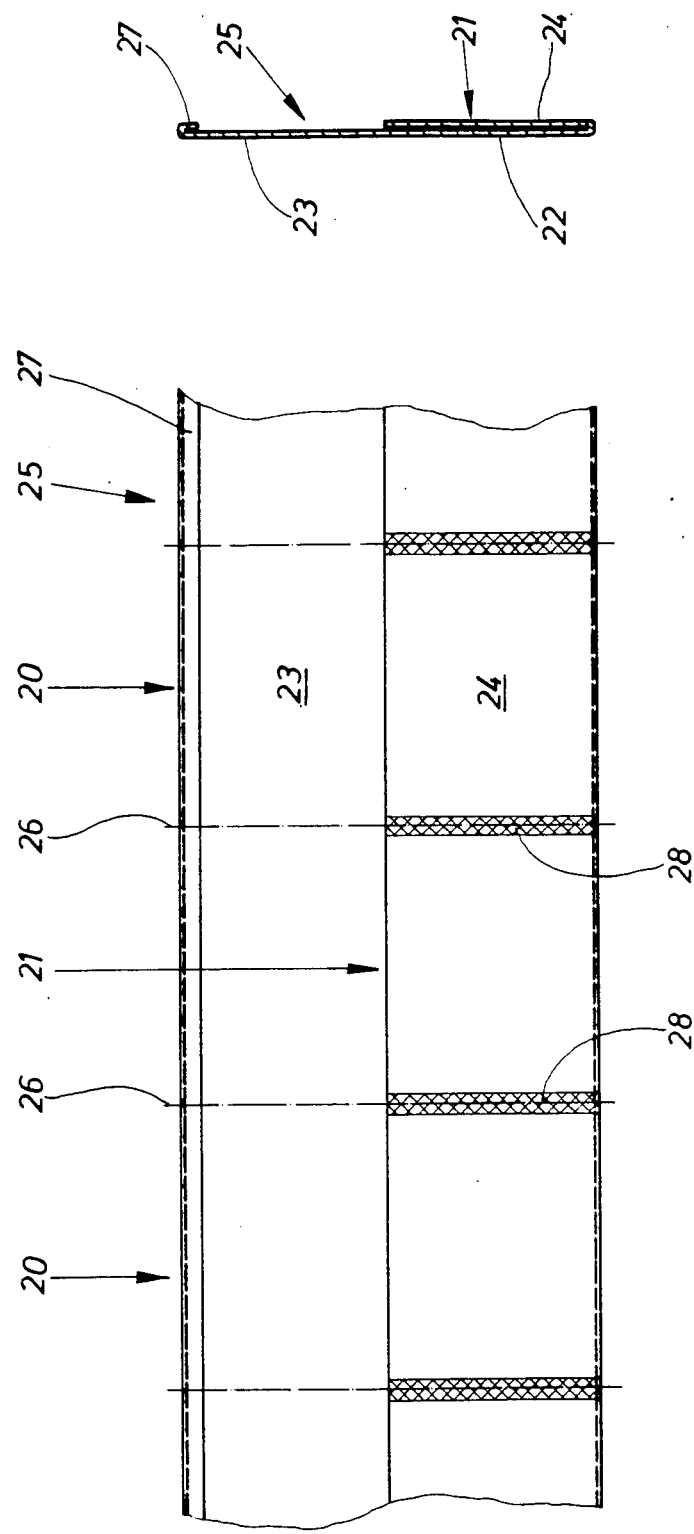

APPARATUS FOR PRODUCING BAGS FROM A TUBULAR SHEET OF THERMALLY WELDABLE FILM MATERIAL

BACKGROUND OF THE INVENTION

The invention relates to an apparatus for producing (packaging) bags from a (tubular) sheet of thermally weldable film which is conveyed in stages and which is provided with welding seams (transverse seams) arranged at distances from one another and extending transversely relative to the sheet. The invention also relates to an apparatus for producing bags of this type.

The packaging bags to be produced serve mainly for holding cut tobacco. The bags consist of a pocket for receiving the bag content (tobacco) and of a closing or twist tab. The bag consists of a blank of thermally weldable plastic film which forms a front wall and a rear wall in the region of the pocket. These are connected to one another by means of welding seams (transverse seams). At the free outer edge of the closing tab, an edge reinforcement is often formed by folding over and welding an edge strip.

SUMMARY OF THE INVENTION

The object of the present invention is to increase bag production per unit of time without disadvantages as regards the quality of the bags and without longer breakdown times for the apparatus.

To achieve this object, the invention is characterised in that the transverse seams are made at least partially during the conveying movement of the sheet.

The invention is based on the knowledge that the welding operation, in particular the formation of the transverse welding seams for limiting the pockets laterally, is time-consuming. The reason for this is that welding tools, in particular welding jaws, have to be heated to the necessary welding temperature for each welding cycle and then have to be cooled within a certain range to stabilize the welding seam. In the process according to the invention, the film sheet is transported further during the formation of the transverse seams, with the welding tools also being moved along.

According to a further proposal of the invention, the welding tool or a welding unit receiving the welding jaws for a plurality of bags runs along with the film sheet only over a part of a complete conveying cycle of the film sheet, in particular over a conveying stage. During some of this conveying stage (part conveying stage), the welding unit or the welding jaws are heated and then cooled, cooling taking place over a longer part of the conveying stage.

The apparatus for producing the bags incorporates a welding unit with a number of narrow strip-shaped welding jaws (transverse welding jaws) corresponding to the number of transverse seams to be made simultaneously. According to the invention, the welding unit or at least the welding jaws of the latter are movable in the direction of transport of the film sheet, together with the latter, along a conveying stage and back into the initial position, specifically particularly in such a way that, during a short standstill or stationery phase of the film sheet, the welding jaws are in the closing (welding) position and are then movable together with the film sheet in the conveying direction of the latter, and during the part of conveying stage in which the welding unit and the film sheet move together, pressure and heat can be transferred to the latter, cooling of the welding jaws then taking place.

Further features relate to the design and functioning of the apparatus in the region of the welding station, especially the welding unit, there being a longitudinal welding jaw which is movable together with the welding unit and which forms a longitudinal welding seam in the region of a film-sheet edge reinforcement produced as a result of a folding-over operation.

BRIEF DESCRIPTION OF THE DRAWINGS

An exemplary embodiment of the invention is explained in more detail below with reference to the drawings. In the drawings:

FIG. 1 shows a plan view of a portion of a film sheet with individual bags not yet severed, FIG. 2 shows a cross-section through the film sheet according to FIG. 1.

DETAILED DESCRIPTION

Figure 3:
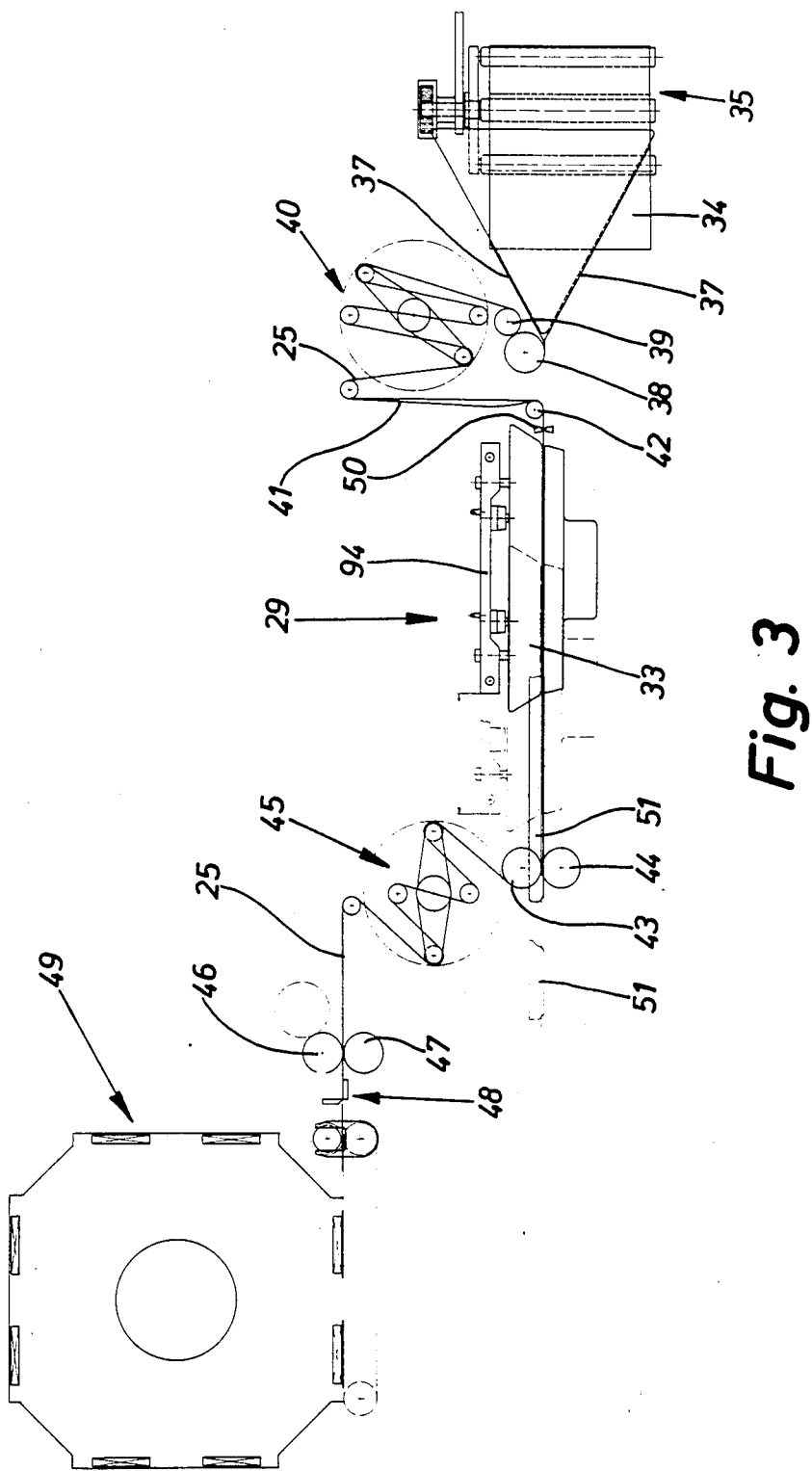
FIG. 3 shows, in a simplified plan view, an apparatus for producing film bags or a film sheet according to FIG. 1.

The invention relates to the production of (packaging) bags 20 which, in the present exemplary embodiment, are formed from a single film consisting of thermally weldable material. A bag 20 in the design shown here consists of a pocket 21 for receiving the bag content, especially cut tobacco, and a closing tab 23 which is joined in one piece to a rear wall 22 of the pocket 21 and which, when the bag is closed, is folded over against a front wall 24 of the pocket 21.

This rectangular bag 20 is produced from a continuous film sheet 25, specifically by being severed from the film sheet in the region of a severing plane 26. For this purpose, the pocket 21 is formed in the region of the latter by folding over a part region of the film sheet 25. Furthermore, an edge reinforcement 27 is formed as a continuous longitudinal strip of the foil sheet 25 by folding round an edge strip of the foil sheet 25.

Before a severing cut is made in the region of the severing plane 26, the pockets 21 are closed laterally by means of double-width transverse welding seams 28.

The edge reinforcement 27 is also fixed by means of a longitudinal welding seam. The severing plane 26 is situated centrally in the region of the double-width transverse welding seam 28.

The transverse welding seams 28 and the longitudinal welding seam in the region of the edge reinforcement 27 are made on the film sheet 25 by a welding unit 29 designed and actuated in a special way. The procedure here is that during a welding cycle several, preferably 3 transverse welding seams 28 are produced by associated transverse welding jaws 30, 31 and 32. The distance between adjacent jaws corresponds to the width of a bag 20. Thus, in each work cycle of the welding unit 29 three bags 20 are produced or defined in the region of the film sheet 25.

In the present exemplary embodiment, the film sheet 25 is conveyed in a vertical plane in the region of the welding unit 29. The welding tools of the latter are also arranged correspondingly. The film sheet 25 is conveyed in the region of the welding unit 29 in steps each of a length defined here as conveying cycle. The length of film sheet 25 transported thereby corresponds to three bags 20 lying next to one another, that is to say, with a width of each of the bags 20 of 140 mm, a length of 420 mm.

To make the welding seams, especially the transverse welding seams 28, heat and pressure have to be transferred to the film sheet 25 by means of the welding jaws (transverse welding jaws 30, 31, 32). Thereafter, cooling in the region of the welding seams is necessary so that these are stabilized sufficiently for the further work cycle. In the present apparatus, the welding unit 29 or the transverse welding jaws 30, 31, 32 and a longitudinal welding jaw 33 still to be described are moved along together with the film sheet 25 in the direction of movement of the latter. The welding seams are made during the joint conveying movement of the welding unit 29 and the film sheet 25. A particular feature is that the welding unit 29 runs along with the film sheet 25 only over a part of the total feed length (conveying cycle), in particular along a conveying stage. During a residual conveying stage of the film sheet 25, the welding unit 29 returns to the initial position with the welding jaws open (i.e. retracted from the film sheet 25 to a non-welding position), so that, at the end of a conveying cycle of the film sheet 25, the welding unit is ready in the initial position to make a further group of transverse welding seams 28 and further welding seams. In an actual situation, the common conveying stage of the welding unit 29 and film sheet 25 (i.e. the distance through which the welding unit and sheet move together) amounts to 240 mm, and accordingly the remaining residual conveying stage of the film sheet 25 during the return movement of the welding unit 29 amounts to 180 mm with an additional 1 mm excess stroke. It is possible to adapt the apparatus to different widths of bags 20 by exchanging the welding tools.

Within this common conveying stage, that is to say the conveying movement of the welding unit 29, pressure and heat are transferred to the film sheet 25 by means of the welding jaws during a portion of this stage. During the remaining part of the conveying stage, the welding jaws, and consequently the welding seams, are cooled. The period of time or conveying distance for heat transfer (welding) is markedly shorter than the conveying distance or period of time for cooling. The actual procedure is that the welding jaws are constantly cooled as a result of the supply of a cooling medium (water in cooling channels). During the heating or welding period, the welding jaws are briefly heated against the cooling medium.

Figure 4:
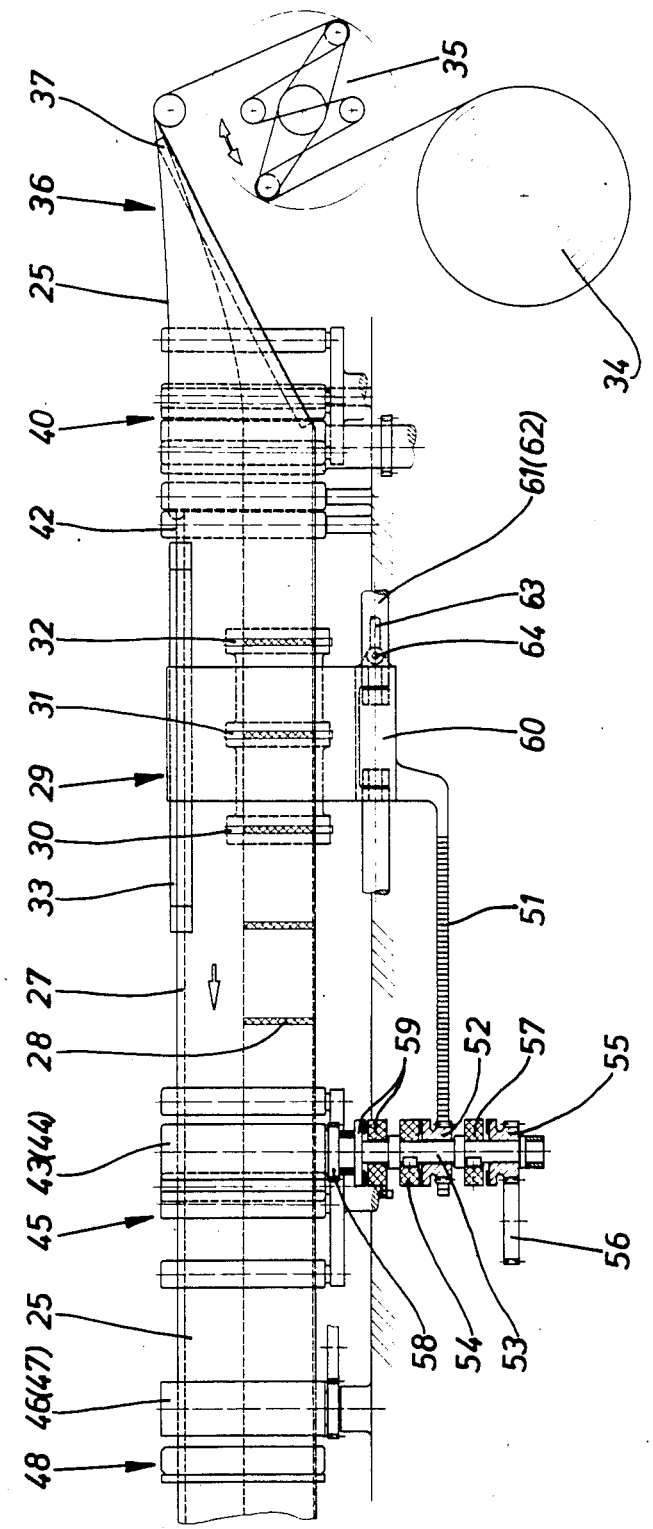
FIG. 4 shows a portion cut out from the apparatus according to FIG. 3 in a longitudinal view.

The basic design of the apparatus emerges from FIGS. 3 and 4. The film sheet 25 is drawn off as flat material from a reel 34 rotating about a horizontal axis. The film sheet then runs via a first film store in the form of a first rotary rocker 35, to compensate differences in the cycle of movement of the film sheet. In the region of a subsequent sheet-folding station 36, a side strip of the film sheet 25 is continuously folded round to form a tubular part cross-section of the film sheet 25 in the region of the pockets 21 to be made subsequently. The film sheet 25, whilst at the same time being deflected into a vertical plane, is guided over two folding bars 37 known in principle, which are arranged at an angle relative to one another, and is thereby folded in the way described.

Located after the sheet-folding station 36 is a first drawing member for transporting the film sheet 25, in particular a pair of first draw rollers 38 and 39. These are followed by a further second sheet store likewise designed as a rotary rocker 40. In the region of a transversely directed conveying section 41, an (upper) edge strip of the film sheet 25 is folded over to form the edge reinforcement 27.

The film sheet 25 prepared by means of folding operations passes via a deflecting foller 42 into the region of the welding unit 29. Located on the outlet side of the latter is a second drawing member for the conveying movement of the film sheet 25, in particular draw rollers 43 and 44. The film sheet 25 is then supplied to a further pair of draw rollers 46 and 47 via a third sheet store in the form of a rotary rocker 45. These are followed by a severing device 48. In the region of the latter, the film sheet 25 is severed by severing knives along the severing plane 26 to form individual bags 20. These are then fed to a turret 49 merely shown diagrammatically. Within the latter, the bags 20 are filled by means not shown in detail.

The film sheet 25 is drawn off from the reel 34 by the draw rollers 38, 39 continuously, but in a nonuniform way, that is to say with changing conveying speeds. The rotary rocker 35 serves to compensate these differences in movement. A similarly important function is performed by the rotary rocker 40 which has to compensate the differences in movement resulting from the continuous conveyance of the sheet through the draw rollers 38 and 39, on the one hand, and the intermittent drawing forward of the film sheet 25 through the draw rollers 43, 44, on the other hand. Since the draw rollers 38, 39 cannot convey exactly a length of film sheet 25 corresponding to the "consumption" in the region of the welding unit 29 or the draw rollers 43, 44, the rotary rocker 40 is equipped with sensors (not shown) for sensing a minimum and a maximum stored quantity. When such an end position of the rotary rocker 40 is reached, the associated sensor is activated, thus influencing the draw rollers 38, 39 in such a way that their conveying capacity is increased or reduced. For this purpose, the draw rollers 38, 39 are appropriately driven by a variable-speed motor (not shown) which is controlled by the said sensors of the rotary rocker 40. When the receiving capacity of the rotary rocker 40 is used up completely, the drive of the draw rollers 38, 39 is switched off.

The draw rollers 43, 44 following the welding unit 29 are driven intermittently in synchronism with the cycle of movement of the welding unit 29. During a short phase of the closing movement of the welding jaws 30 to 33, the film sheet 25 and the draw rollers 43, 44 are at a standstill. Immediately after this, the welding unit 29 is moved together with the film sheet 25 in the conveying direction of the latter. During this phase, the welding unit 29 takes over the transport (forward drawing) of the film sheet 25 together with the draw rollers 43, 44. After the end of the joint conveyance within a conveying stage (225° of the conveying cycle), during the residual or remaining conveying stage (135°) the film sheet is conveyed solely by the draw rollers 43, 44 which continue to be driven, whilst at the same time the open welding unit (disengaged from the film sheet) returns to the initial position.

The welding unit 29 and draw rollers 43, 44 are connected operatively to one another. A rack 51 attached to the welding unit 29, in particular to a main carrier 60 acting as a slide, is engaged with a pinion 52 on a drive shaft 53 of the draw roller 44. A first coupling 54 is assigned to the rack 51 and pinion 52.

During the transmission of the drive from the welding unit 29 to the draw rollers 43, 44, this coupling 54 is in the closing position.

A further pinion 55 on the drive shaft 53 is engaged with a drive wheel 56 of a separate drive (not shown in detail). This pinion 55 also has assigned to it a coupling 57 which is open in the position according to FIG. 4, so that no rotary movement is transmitted to the drive shaft 53 via the drive wheel 56. During the return movement of the welding unit 29, the coupling 54 is disengaged, so that the pinion 52 runs idly, and at the same time the coupling 57 is moved into the closing position, so that over the further part of a conveying cycle the draw rollers 43, 44 are driven via the drive wheel 56. The two draw rollers 43 and 44 are each geared to one another via a gear wheel 58.

Furthermore, arranged on the drive shaft 53 is an electrical brake 59, by means of which the draw rollers 43, 44 are stopped exactly in position when the feed of the sheet is temporarily interrupted when the welding unit 29 stops. Uncontrolled (further) movements of the film sheet 25 are prevented by the electrical brake 59 which then engages.

The drive of the draw rollers 43, 44 is controlled by sensors 50 which, in the present case, are arranged after the deflecting roller 42 in front of the welding unit 29 in the conveying direction. The sensors 50 sense the film sheet 25 photoelectrically with reference to control marks. According to these, the drive of the drive shaft 53 is changed over by actuating one coupling 54, and the other 57.

The rotary rocker 45 arranged after the draw rollers 43 and 44 in the transport direction compensates conveying differences in respect of the draw rollers 46 and 47. The latter are synchronised with the working mode of the turret 49. When faults arise in the region of the turret 49, for example when no tobacco is supplied, the draw rollers 46, 47 are stopped. The rotary rocker 45 can then receive film sheet for up to three work cycles of the draw rollers 46, 47, until the following units are also switched off. A length of film sheet 25 corresponding to the dimension (width) of a bag 20 is drawn off each time by the draw rollers 46 and 47.

The rotary rockers 35, 40 and 45 as an exemplary embodiment of a sheet store are preferably designed in the way described in German Patent Application P 34 10 470.4.

In the present exemplary embodiment, the welding unit 29 executes forty cycles per minute. During the simultaneous production of three bags 20 per work cycle, the pair of draw rollers 46, 47 is driven intermittently in such a way that 120 bag lengths of the film sheet 25 are conveyed per minute. After each conveying cycle of the draw rollers 46, 47, a bag 20 is cut off by the severing device 48.

The turret 49, merely shown diagrammatically in the present case, is operated at sixty strokes per minute. Thus, two bags 20 are filled simultaneously during a standstill phase.

The welding unit 29 is equipped with the three transverse welding jaws 30, 31, 32 arranged vertically and at distances from one another and, above these, with a longitudinal welding jaw 33 extending over the entire length of a conveying cycle. Furthermore, actuating and retaining members for the welding-jaws are part of the welding unit 29. This is arranged on the displaceable main carrier 60 mounted displaceably on main supporting rods 61 and 62 extending in the conveying direction. The main carrier 60 is designed as a casting and acts in the same way as a slide which is movable to and fro on the main supporting rods 61, 62 by means of a connecting rod 63. The connecting rod 63 is connected to the main carrier 60 via a joint 64. The drive for the connecting rod, for example a crank, is not shown for the sake of simplification. The carrier 60, rod 63 and joint 64 form a driving means for the welding unit 29 including the three jaws.

A supporting structure 65 for the transverse welding jaws 30 to 32 is mounted on the main carrier 60. Vertical supporting legs 66, 67 are connected directly to the main carrier 60. Two transversely directed transverse supporting rods 68, 69, 70, 71 arranged at a distance above one another are attached to each of the supporting legs 66 and 67. The ends, facing away from the film sheet 25, of each set of two transverse supporting rods 68, 69 and 70, 71 arranged above one another are connected to one another by means of respective vertical struts 72 and 73.

Mounted displaceably on the transverse supporting rods 68 to 71 is a supporting member for the transverse welding jaws 30 to 32, in particular a welding-jaw carrier 74. This is mounted displaceably on the transverse supporting rods 68 to 71 by means of four sliding sleeves 75.

Mounted at a vertical distance from one another in the welding-jaw carrier 74 are two retaining rods 76 and 77 extending in the conveying direction of the film sheet 25, in particular parallel to this. Fastened (releaseably) to these in turn at a distance from one another in the longitudinal direction are three welding-jaw holders 78, 79, 80. These in turn each carry a transverse welding jaw 30, 31, 32, specifically each by means of two supporting bolts 81, 82 arranged above one another and mounted displaceably in the welding-jaw holders 78, 79, 80.

A system (not shown in detail) of cooling channels is arranged within the transverse welding jaws 30, 31, 32 for the (permanent) cooling of the transverse welding jaws, although cooling periodically does not take effect because of the high heating.

Figure 7:
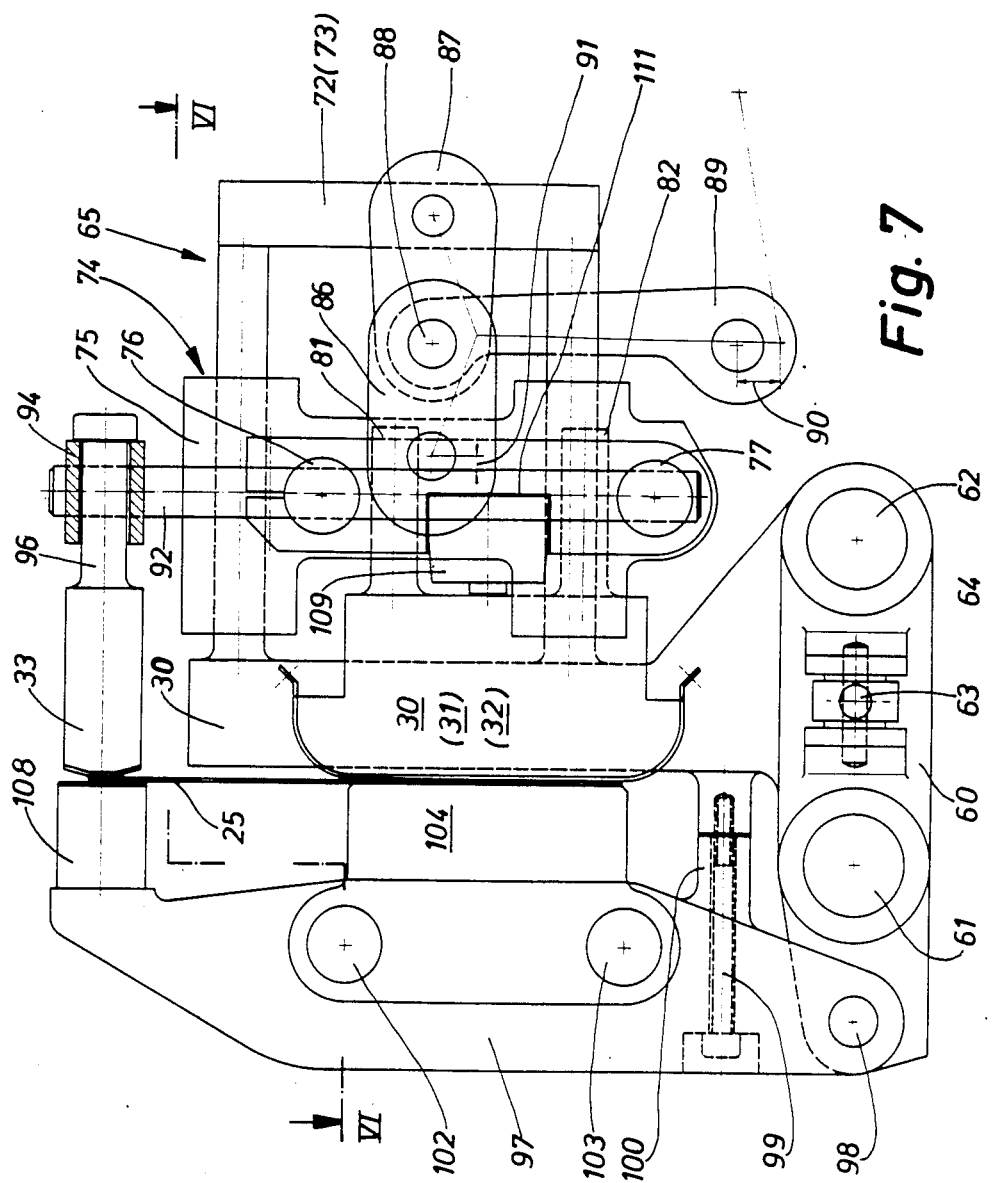
FIG. 7 shows a transverse view of details of the welding unit.
Figure 8:
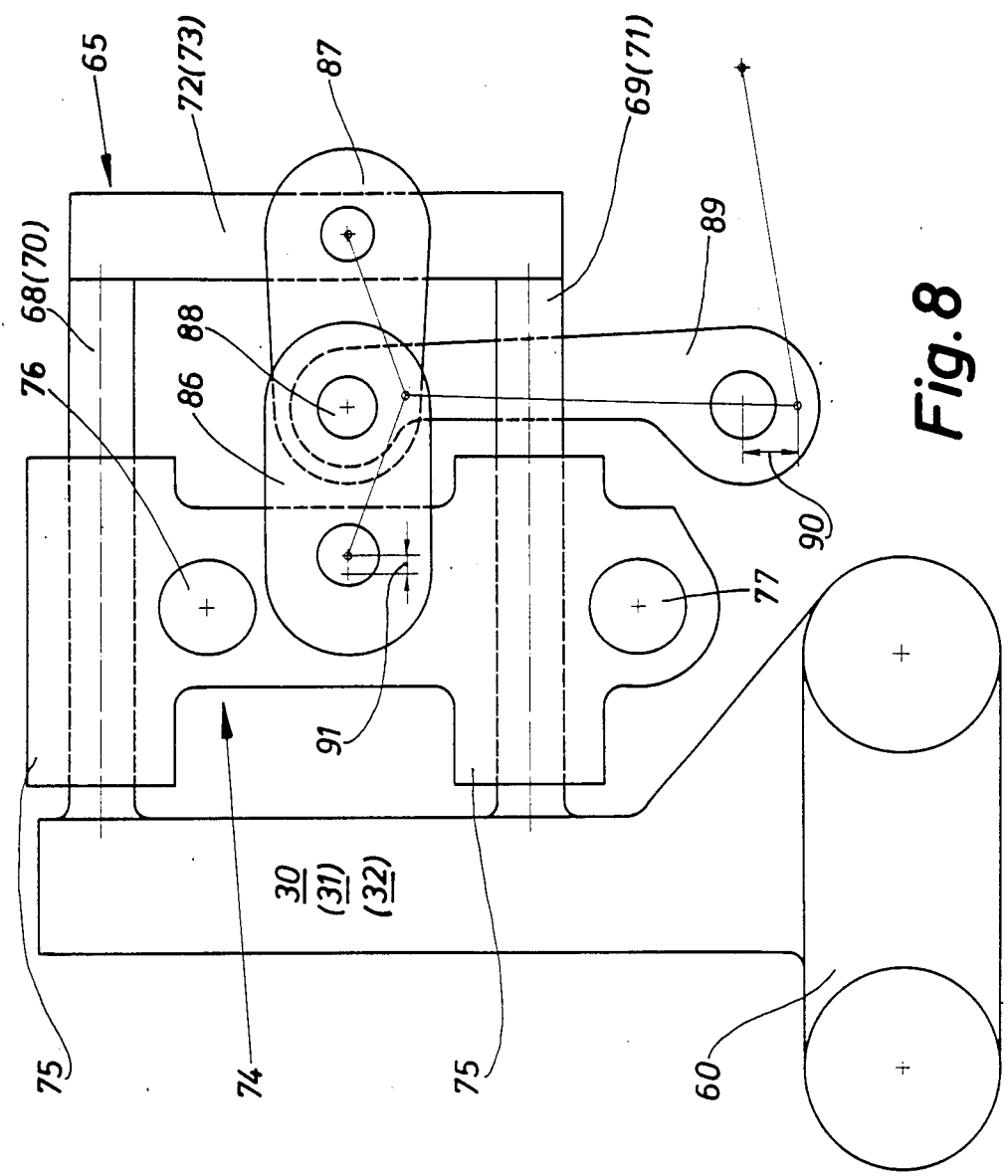
FIG. 8 shows a further transverse view of details of the welding unit.
Figure 9:
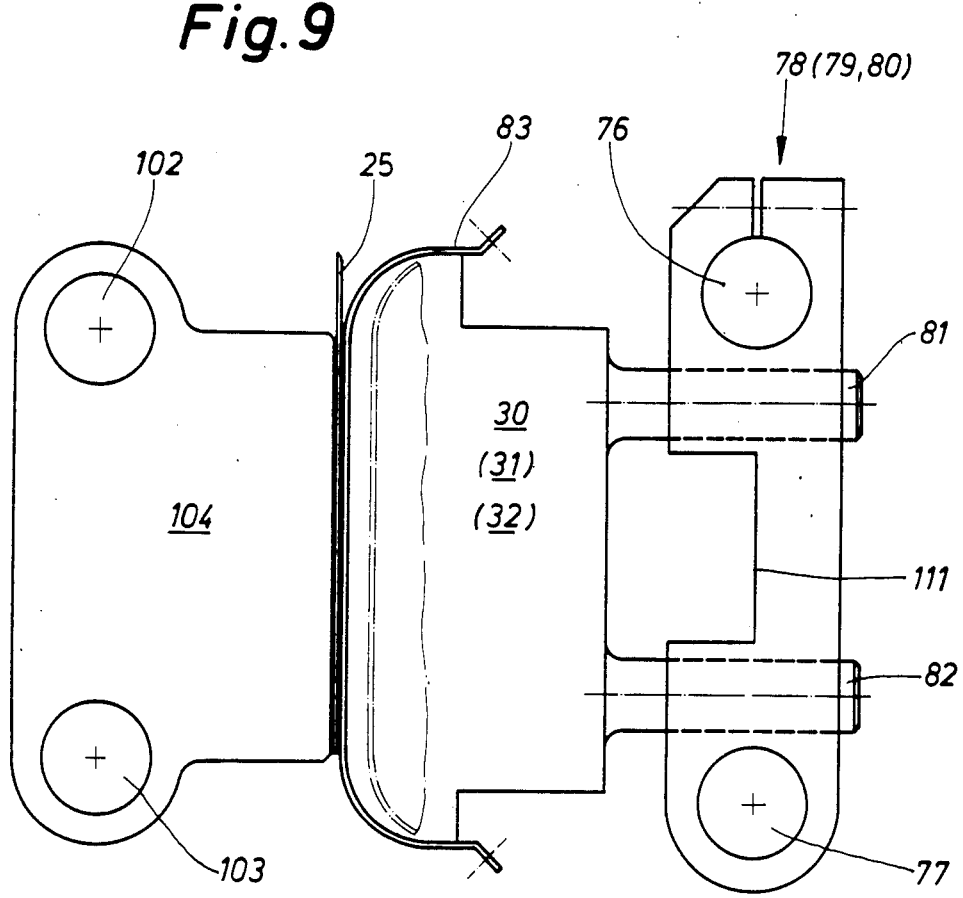
FIG. 9 shows, in a side view, welding tools, in particular transverse welding jaws.

The (three) transverse welding jaws 30, 31, 32 are moved into the welding position (up against the film sheet 25) and back again by means of an actuating mechanism. As illustrated, a toggle welding-jaw carrier 74 is attached to each of the struts 72, 73. For this purpose, in each case a first pressure lever 86 is connected in an articulated manner to the welding-jaw carrier 74 on one side of the latter, whilst a further pressure lever 87 is supported in an articulated manner on the associated strut 72, 73. The pressure levers 86, 87 are connected to one another in a common toggle joint. Attached to this at the same time is an actuating arm 89 which can move up and down. As a result of the up-and-down movement of the latter (the stroke 90), the welding-jaw carrier 74 is shifted the amount of the closing stroke 91 via the pressure levers 86, 87. The closing or welding position is shown in FIG. 7. As a result of a downward movement of the actuating arm 89, the welding-jaw carrier 74, together with the transverse welding jaws 30 to 32, is retracted, thus freeing the film sheet 25. The actuating arm 89 can be driven in any known way.

Figure 5:
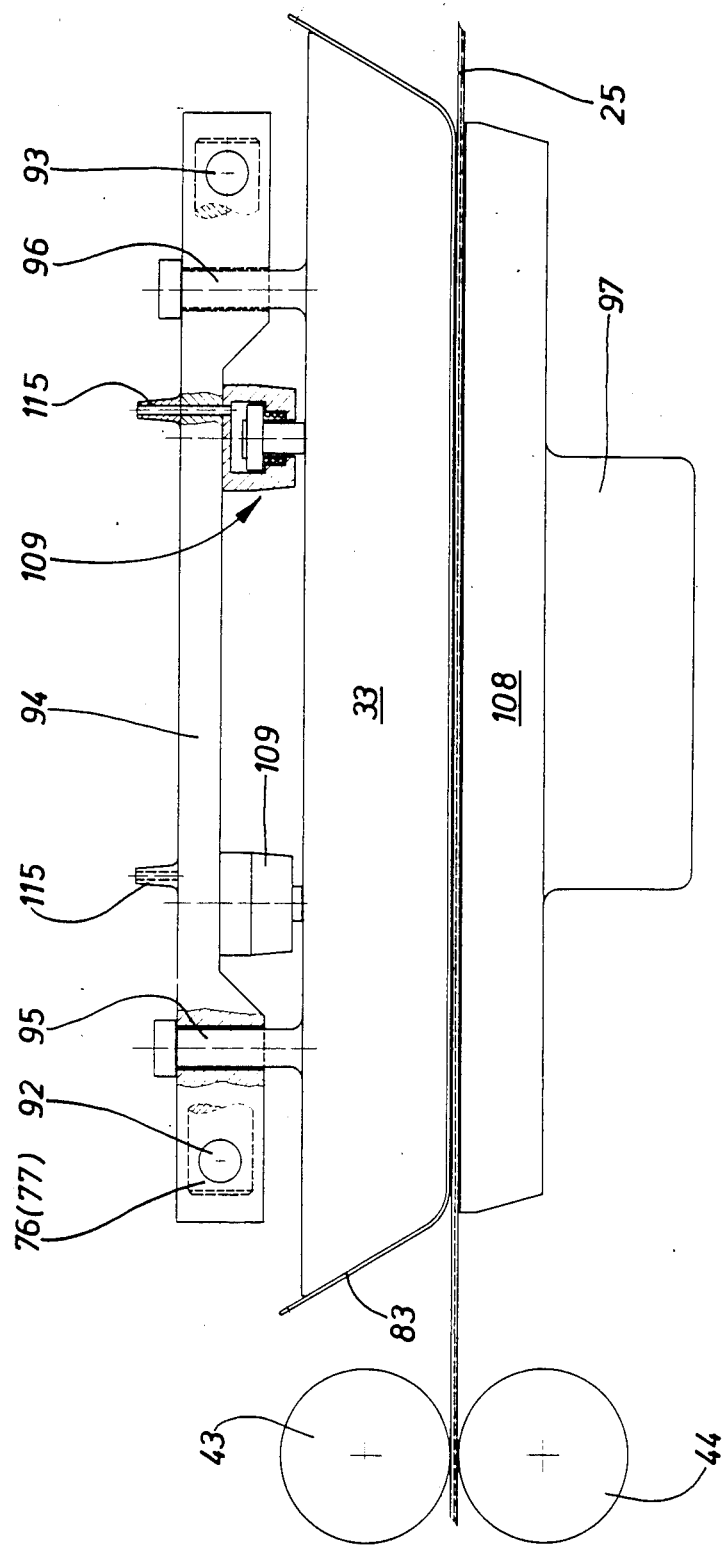
FIG. 5 shows a plan view of a detail of a welding unit of the apparatus according to FIG. 3 on an enlarged scale.
Figure 6:
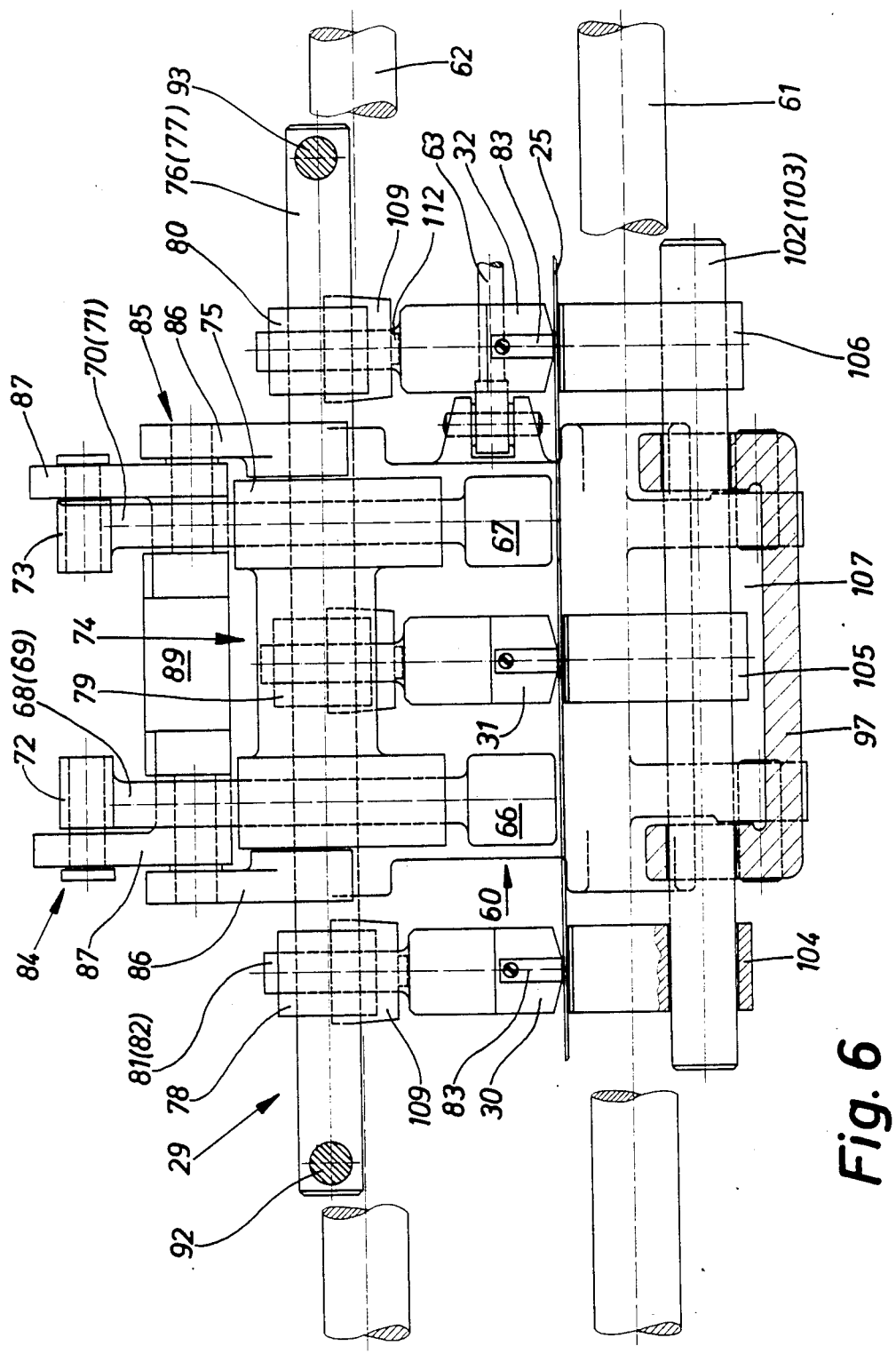
FIG. 6 shows a further representation in the form of a plan view of a detail of the welding unit, partially in a horizontal section according to VI—VI in FIG. 7.

The longitudinal welding jaw 33 is also connected to the welding-jaw carrier 74. For this purpose, vertical bracing bolts 92, 93 are fastened to the ends of the retaining rods 76, 77. Supported in turn on these bracing bolts 92, 93 is an intermediate carrier 94 for the longitudinal welding jaw 33. The latter is connected to the intermediate carrier 94 via retaining pins 95, 96 so as to be displaceable relative to a supporting member. FIG. 5 shows the working position of the longitudinal welding jaw 33. In this relative position, the longitudinal welding jaw 33 is moved, together with the transverse welding jaws 30, 31, 32, into the welding position and back again in the way described.

Counterpressure members connected to the welding unit 29 are arranged on the side of the film sheet 25 located opposite the welding jaws 30 to 33 and are assigned respectively to the latter. For this purpose, a vertical supporting wall 97 is connected to the welding-jaw carrier 74, in the present case by means of a hinge joint 98. This makes it possible to swing back the entire supporting wall 97 to carry out cleaning or repair work on important parts of the welding unit 29. In the working position (FIG. 7), the supporting wall 97 is secured in the vertical position by fastening screws 99 and is positioned exactly by means of stop projections 100 and 101 on the supporting wall 97 on the one hand and on the supporting legs 66, 67 on the other hand.

Counter-supporting rods 102, 103 extending in the longitudinal direction or conveying direction of the film sheet 25 are mounted on the supporting wall 97. Corresponding counter jaws 104, 105, 106 are located on these counter-supporting rods 102, 103 opposite the transverse welding jaws 30, 31, 32. The supporting wall 97 is provided with a cut-out portion 107 in the middle region for receiving the middle counter jaw 105. The counter jaws 104 to 106 are arranged essentially fixedly, that is to say they are pivotable only together with the supporting wall 97 as a whole. An upper extension of the supporting wall 97 is provided with a longitudinal counter jaw 108 located opposite the longitudinal welding jaw 33.

Figure 10:
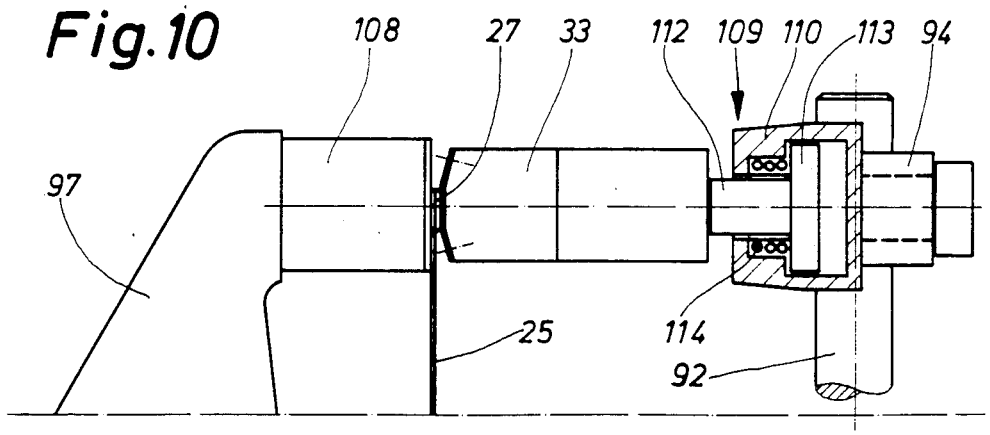
FIG. 10 shows another embodiment of welding tools, in particular a longitudinal welding jaw, in a side view with a further detail in longitudinal section.
Figure 11:
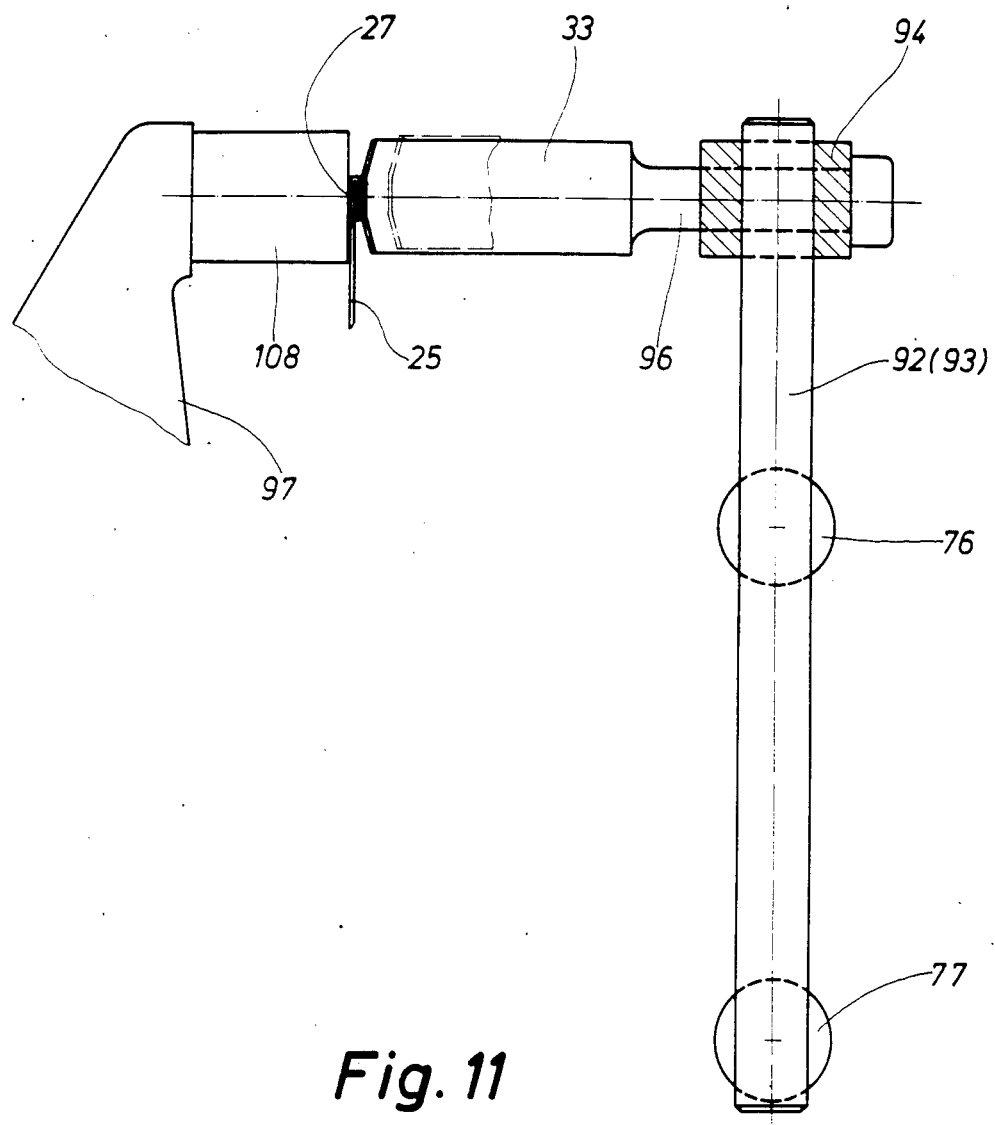
FIG. 11 shows a longitudinal welding jaw according to FIG. 10 in a side view or view offset relative to FIG. 10.

The welding jaws 30 to 33 are provided with further movability. For this purpose, the transverse welding jaws 30, 31 and 32 are each supported additionally via an elastic pressure member 109, in particular on the associated welding-jaw holder 78, 79, 80. The pressure members 109 are accommodated by means of a cylindrical housing 110 (FIG. 10) in respective recesses 111 in the welding-jaw holders 78, 79, 80.

A pressure pin 112 exerting pressure on the associated welding jaw 30 to 33 projects from the cylindrical housing 110. In the normal position, the pressure pin or a piston 113 in the cylindrical housing 110 is constantly subjected to a pressure medium, especially compressed air, endeavouring to extend it. The position (FIG. 10) is maintained counter to the load of a compression spring 114.

This arrangement serves for adjusting the welding jaws 30 to 33 in the event of a cut-off caused by a fault. In this case, the to-and-fro movement of the welding unit 29 is maintained even when the film sheet is at a standstill. At the same time, the welding jaws 30 to 33 are constantly kept at a distance from the film sheet 25, that is to say even during movement in the conveying direction, specifically by cutting off the compressed air on the piston 113, so that the pressure pin 112 is retracted by the compression spring 114. The transverse welding jaws 30 to 32 can now, as a result of the displacement of the supporting bolts 81, 82, be moved in the welding-jaw holders 78, 79, 80 into a slightly set-back position, specifically as a result of an appropriate control by means of the toggle mechanisms 84, 85.

The longitudinal welding jaw 33 is supported on the intermediate carrier 94 by means of two pressure members 109 of this type. When air is removed from the cylindrical housings 110 and the pressure pins 112 are retracted, the retaining pins 95, 96 are displaced in the intermediate carrier 94, so that the longitudinal welding jaw 33 assumes, even in the working position, a position at a slight permanent distance from the film sheet 25. The compressed air is directed to the cylindrical housing 110 via compressed-air connections 115.

When the temporary interruption in operation has been eliminated, the pressure members 109 are subjected to compressed air again, so that the welding jaws are moved back into the original normal relative position by the extending pressure pins 112.

Figure 12:
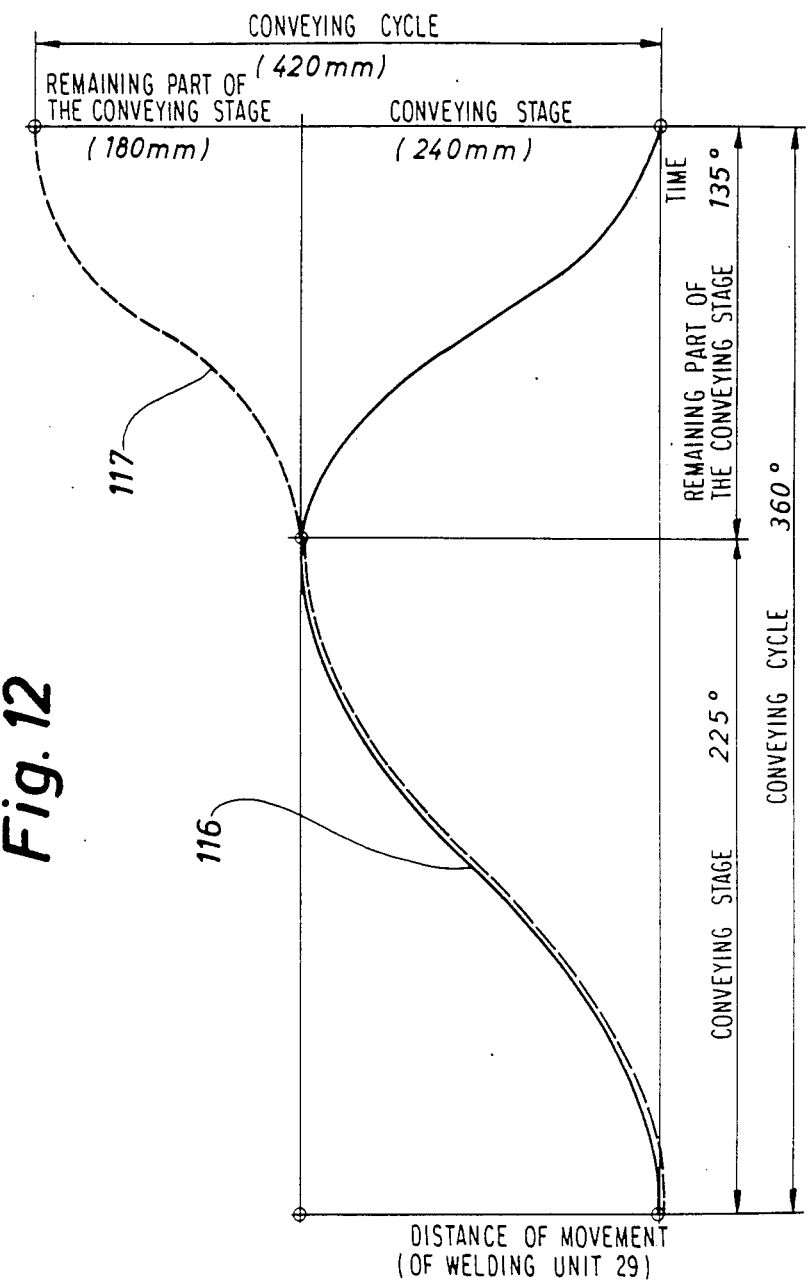
FIG. 12 shows a diagram of cycles of movement of the apparatus.

A cycle of movement of the welding unit or of the film sheet is shown in the diagram according to FIG. 12. This is a distance/time diagram. The unbroken line 116 represents the movement of the welding unit 29, whilst the broken line shows the drive of the draw rollers 43, 44. As is evident, the residual conveying stage amounts to 3/5 of the conveying stage.

FIGS. 13–18 show a sequence of illustrations which illustrate the relative motions of the welding unit and the film sheet during operation of the apparatus.

Figure 13:
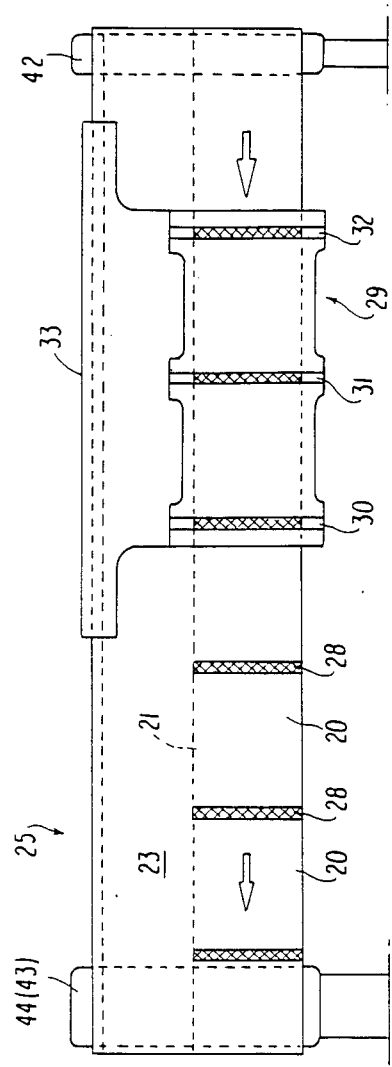
FIGS. 13-18 illustrate, in a sequence, the various positions of the welding unit and the film sheet during operation of the apparatus.
Figure 14:
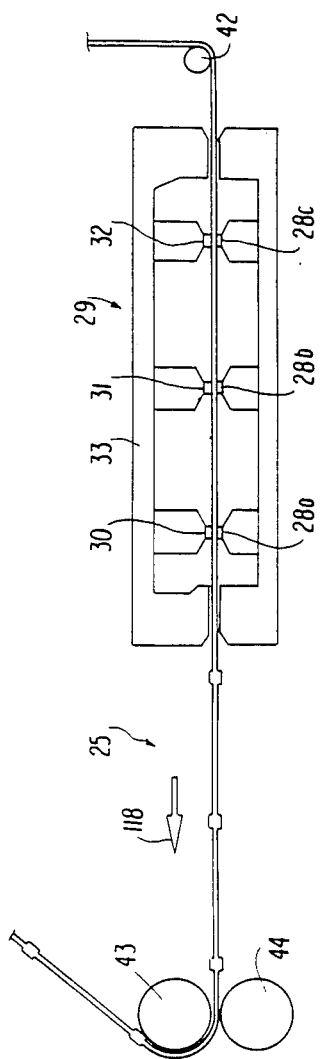

More specifically, FIGS. 13 and 14 are a side view and horizontal plan view, respectively, of the welding unit (29) in the closed or welding position of the transverse welding jaws (30, 31 and 32). Here, the seal-forming process for the transverse welding seams (28) is performed while the film sheet (25) is being conveyed or transported along with the welding unit (29). As can be seen, three transverse weld seams (20a, 20b and 20c) are simultaneously produced. Immediately upon the closing of the transverse welding jaws, the film sheet is immediately transported in the direction of the arrow 118 by means of the draw rollers (43 and 44) which, as previously described, are operably connected to the welding unit (29) and driven by the movement thereof.

Figure 15:
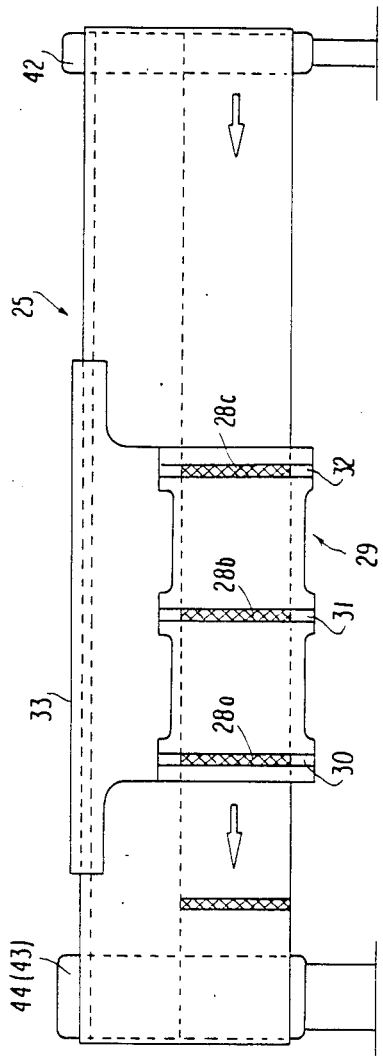
Figure 16:
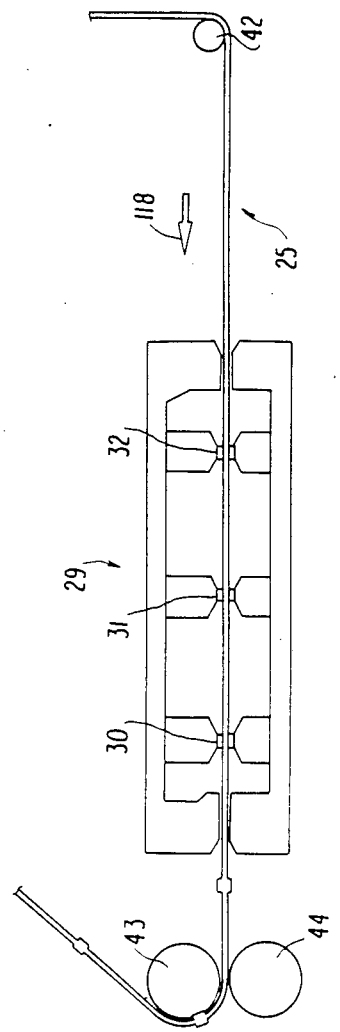
Figure 17:
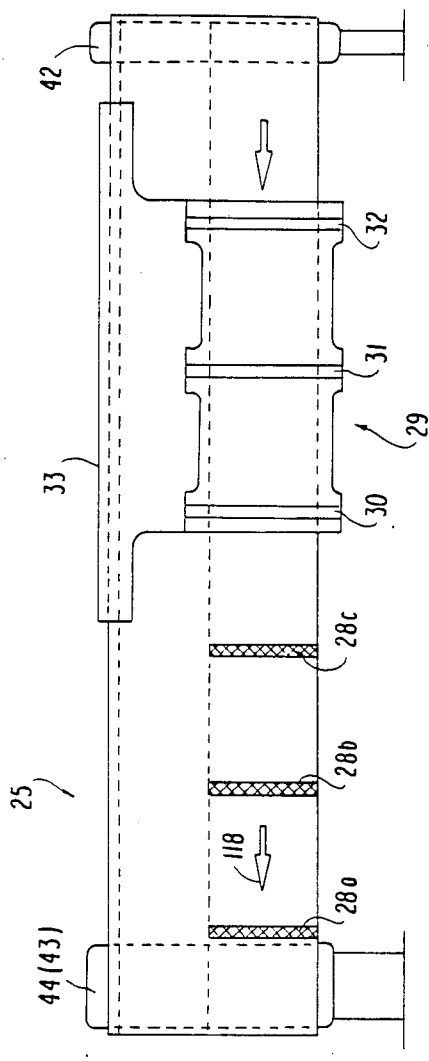
Figure 18:
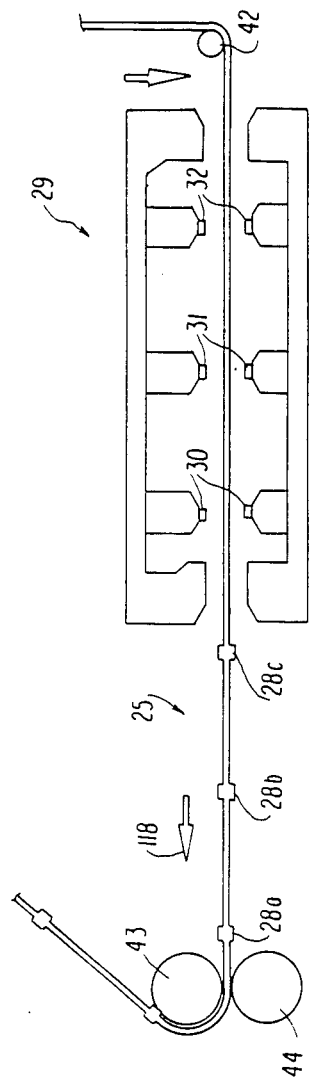

The movement of the film sheet (25) with the welding unit (29) continues until the position shown in FIG. 15 (side view) and FIG. 16 (horizontal plan view) is reached. After reaching this end position, the transverse welding jaws (30, 31 and 32), as well as the longitudinal welding jaw (33), are opened or disengaged. As shown in FIGS. 17 and 18, the welding unit, in the open position of the welding jaws, is returned to the position shown in FIGS. 13 and 14. During this returning motion of the welding unit 29, the film sheet 25 continues to be conveyed by the draw rollers 43 and 44. The film sheet 25 is conveyed over the distance necessary to produce, between the last transverse weld seam (28c) and the first transverse weld jaw (30), a distance which is exactly equal to the width of the package with respect to the desired width between two successive transverse weld seams (28). Thus, the apparatus simultaneously produces three or more packages (20) by the simultaneous production of the three transverse weld seams (28, 28b and 28c).

We claim:

1. Apparatus for producing bags from a continuous tubular sheet of thermally weldable film material which is conveyed in stages by a sheet-drive mechanism, and having welding means including a plurality of welding jaws for welding, in a direction transverse to the conveying direction, in the sheet a plurality of transverse welding seams spaced apart in the conveying direction by a distance corresponding to the width of a bag, characterized in that there are provided:

a sheet-drive mechanism for conveying a thermally weldable film material in stages;

first means for bringing the welding jaws (30, 31, 32), during a short stationary phase of the film sheet (25), into seam-welding position;

second means for disengaging, after completion of the welding, the welding jaws from said welding position and returning them to a starting position;

jaw-drive means for moving said welding jaws in said conveying direction and in the opposite direction; and coupling means for coupling the sheet-drive mechanism to said jaw-drive means only when said welding jaws are in the welding position so that said sheet and said welding jaws are moved together in the conveying direction.

2. Apparatus according to claim 1, characterized in that said sheet-drive mechanism comprises draw rollers, and in that after the welding jaws (30, 31, 32; 33) of the welding means (29) have been disengaged, said draw rollers further convey the film sheet (25) solely by means of the draw rollers (43, 44) until the end of a conveying cycle.

3. Apparatus according to claim 2, characterized in that said jaw-drive means drives the welding means (29) in said opposite direction during the further transport, in said conveying direction, of the film sheet (25) through the draw rollers (43, 44) until the completion of a conveying cycle.

4. Apparatus according to claim 1, characterized in that the length of the film sheet (25) conveyed during a conveying cycle corresponds to the width of three bags (20) lying next to one another.

5. Apparatus according to claim 1, characterized in that three transverse-welding jaws (30, 31, 32) for the simultaneous production of three bags (20) are arranged on a welding-jaw carrier (74) of the welding means (29) and are adapted to be pressed jointly against the film sheet (25).

6. Apparatus according to claim 5, characterized in that the welding-jaw carrier (74) for the joint and simultaneous pressing of the transverse-welding jaws (30, 31, 32) is displaceable by means of a common toggle mechanism (84, 85).

7. Apparatus according to claim 6, characterized in that the welding-jaw carrier (74) is mounted displaceably on a supporting structure (65), comprising transverse supporting rods (68, 69, 70, 71), and is controlled by two toggle mechanisms (84, 85) likewise connected to the supporting structure (65).

8. Apparatus according to claim 7, characterised in that the supporting structure (65) for receiving the welding-jaw carrier consists of vertical supporting legs (66, 67), horizontally directed transverse supporting rods (68, 69, 70, 71) arranged on said legs and vertical struts (72, 73) connecting their ends to one another, the toggle mechanisms being supported on the struts (72, 73) by means of a pressure lever (87).

9. Apparatus according to claim 8, characterised in that the supporting legs (66, 67) are connected to a main carrier (60) displaceable to and fro in the direction of transport of the film sheet (25), the main carrier (60) being arranged displaceably on main supporting rods (61, 62) pointing in the conveying direction of the film sheet (25).

10. Apparatus according to claim 9, characterised in that fixed counterjaws (104, 105, 106) and a longitudinal counter jaw (108) are arranged respectively opposite the transverse-welding jaws (30, 31, 32) and/or the longitudinal welding jaw (33) on the side located opposite in relation to the film sheet (25), the counter jaws (104 to 108) being attached to a supporting member likewise connected to a vertical supporting wall (97) attached pivotably to the main carrier (60).

11. Apparatus according to claim 5, characterised in that each transverse-welding jaw (30, 31, 32) is mounted on a welding-jaw holder (78, 79, 80) and is connected to transversely directed supporting members, comprising two supporting bolts (81, 82) arranged at a distance from one another, the welding-jaw holders (78, 79, 80) being connected to the common welding-jaw carrier (74) via retaining rods (76, 77).

12. Apparatus according to claim 11, characterised in that a longitudinal welding jaw (33) is arranged above the transverse welding jaws (30, 31, 32), extends over the full length of a section of the film sheet (25) conveyed during a conveying cycle and serves for welding an edge reinforcement (27) of the film sheet (25).

13. Apparatus according to claim 12, characterised in that the longitudinal welding jaw (33) is connected to the welding-jaw carrier (74) by means of vertical bracing bolts (92, 93) which are themselves fastened to the retaining rods (76, 77) for the welding-jaw carrier (74).

14. Apparatus according to claim 11, characterised in that the welding jaws (30, 31, 32; 33) are movable relative to said supporting members of the latter by means of prestressed pressure members (109) which, after a block has been removed, as a result of the cut-off of counteracting compressed air, exert a retracting effect which is such that by means of an appropriate control the welding jaws assume a position at a distance from the film sheet (25) even in the welding position.

15. Apparatus according to claim 14, characterised in that the pressure members (109) consist of a cylindrical housing (110), in which a pressure pin (112) with a piston (113) is mounted displaceably, the piston (113) being loaded by a compression spring (114) into a retracted position and being held by means of compressed air, counter to the load of the compression spring (114) in the extended, welding position of the welding jaws (30, 31, 32; 33).

16. Apparatus according to claim 14, characterised in that the pressure members (109) assigned to the transverse welding jaws (30, 31, 32) are arranged in recesses (111) in the welding-jaw holders (78, 79, 80).

17. Apparatus according to claim 1, characterized in that said sheet-drive mechanism comprises draw rollers (43, 44); and that said coupling means comprises a rack (51), associated with said jaw-drive means, and a pinion (52) associated with said draw rollers (43, 44).

18. Apparatus according to claim 17, characterised in that said coupling means comprises two couplings (54, 57) assigned to the draw rollers (43, 44) and mounted on a common drive shaft (53), and the drive shaft (53) can be connected by means of the couplings (54, 57) alternately to the pinion (52) rotatable by means of the rack (51) and to a further pinion (55) which is engaged with a separate drive wheel (56), the change-over between the couplings (54, 57) at the end of conveyance of the film sheet (25) through the welding unit (29).

19. Apparatus according to claim 1, characterized in that at least one sheet store, in the form of a rotary rocker (40, 45), is arranged respectively in front of and behind the welding means (29) in the conveying direction of the film sheet (25), to compensate differences in the movement characteristics of the film sheet (25), and in that said sheet-drive mechanism comprises a first pair of draw rollers (48, 44).

20. Apparatus according to claim 19, characterised in that there is provided: means for drawing the film sheet (25) off flat from a reel (34); rotary rocker means (35) for further conveying the sheet; and comprising means for folding the sheet to form a tube-like film sheet (25) and a further pair of draw rollers (38, 39) for the film sheet (25) and located after said folding means, said folding means comprising folding bars (37).

21. Apparatus according to claim 19, characterised in that, arranged after the rotary rocker (45) following the welding means (29) in the conveying direction of the latter, is a further pair of draw rollers (46, 47) for the film sheet (25), by means of which the film sheet can be supplied to a severing device (48) for severing the bags each at a feed length corresponding to the width of one bag (20).

* * * * *